United States Patent
Podbielski et al.

(10) Patent No.: US 11,286,993 B2
(45) Date of Patent: Mar. 29, 2022

(54) SEGMENTED AND LAMINATED ONE-WAY CLUTCH COMPONENTS

(71) Applicant: BorgWarner Inc., Auburn Hills, MI (US)

(72) Inventors: David L. Podbielski, Cedar Lake, IN (US); James R. Papania, Boilingbrook, IL (US); Martin P. Keating, Plainfield, IL (US)

(73) Assignee: BorgWarner Inc., Auburn Hills, MI (US)

(*) Notice: Subject to any disclaimer, the term of this patent is extended or adjusted under 35 U.S.C. 154(b) by 297 days.

(21) Appl. No.: 16/043,883

(22) Filed: Jul. 24, 2018

(65) Prior Publication Data

US 2020/0032858 A1    Jan. 30, 2020

(51) Int. Cl.
| F16D 13/64 | (2006.01) |
| F16D 41/12 | (2006.01) |
| F16D 69/02 | (2006.01) |
| F16D 69/00 | (2006.01) |
| F16D 69/04 | (2006.01) |

(52) U.S. Cl.
CPC ........... F16D 13/648 (2013.01); F16D 41/12 (2013.01); *F16D 69/02* (2013.01); *F16D 2069/004* (2013.01); *F16D 2069/0441* (2013.01)

(58) Field of Classification Search
CPC ...... F16D 41/06; F16D 41/063; F16D 41/064; F16D 41/066; F16D 41/067; F16D 41/069–105; F16D 41/12; F16D 41/14; F16D 41/16
See application file for complete search history.

(56) References Cited

U.S. PATENT DOCUMENTS

| 4,674,616 | A | 6/1987 | Mannino, Jr. |
| 5,332,075 | A | 7/1994 | Quigley et al. |
| 5,713,450 | A | 2/1998 | Quigley |
| 5,897,737 | A | 4/1999 | Quigley |
| 6,575,279 | B2 | 6/2003 | Quigley |
| 6,668,891 | B2 | 12/2003 | Collis |
| 6,745,881 | B1 | 6/2004 | Kremer |
| 7,478,719 | B2 | 1/2009 | Voegele |
| 7,798,301 | B2 | 9/2010 | Keating et al. |
| 8,360,221 | B2 | 1/2013 | Neubauer et al. |
| 9,951,826 | B2 | 4/2018 | Voegele et al. |
| 2004/0099371 | A1* | 5/2004 | Hardies ................ F16D 13/648 156/297 |
| 2010/0065389 | A1* | 3/2010 | Gilboy ................. F16D 65/092 188/251 R |
| 2018/0073575 | A1* | 3/2018 | Hixenbaugh .......... F16D 13/16 |

* cited by examiner

*Primary Examiner* — Stacey A Fluhart
(74) *Attorney, Agent, or Firm* — von Briesen & Roper, s.c.

(57) ABSTRACT

A rotatable inner race is disclosed. The inner race may include a plurality of arcuate segments each having a first end with a first end geometry and a second end with a second end geometry. The first and second end geometries may be complimentary to each other to join adjacent arcuate segments at an interlocking joint. The rotatable inner race may further include a plurality of race engagement notches extending radially from an outer circumferential surface of each arcuate segment and the plurality of arcuate segments are joined together at the interlocking joints to form a race ring and the plurality of race engagement notches of each arcuate segment align with one another to define an array of race engagement notches around an outer circumference of the race ring.

11 Claims, 4 Drawing Sheets

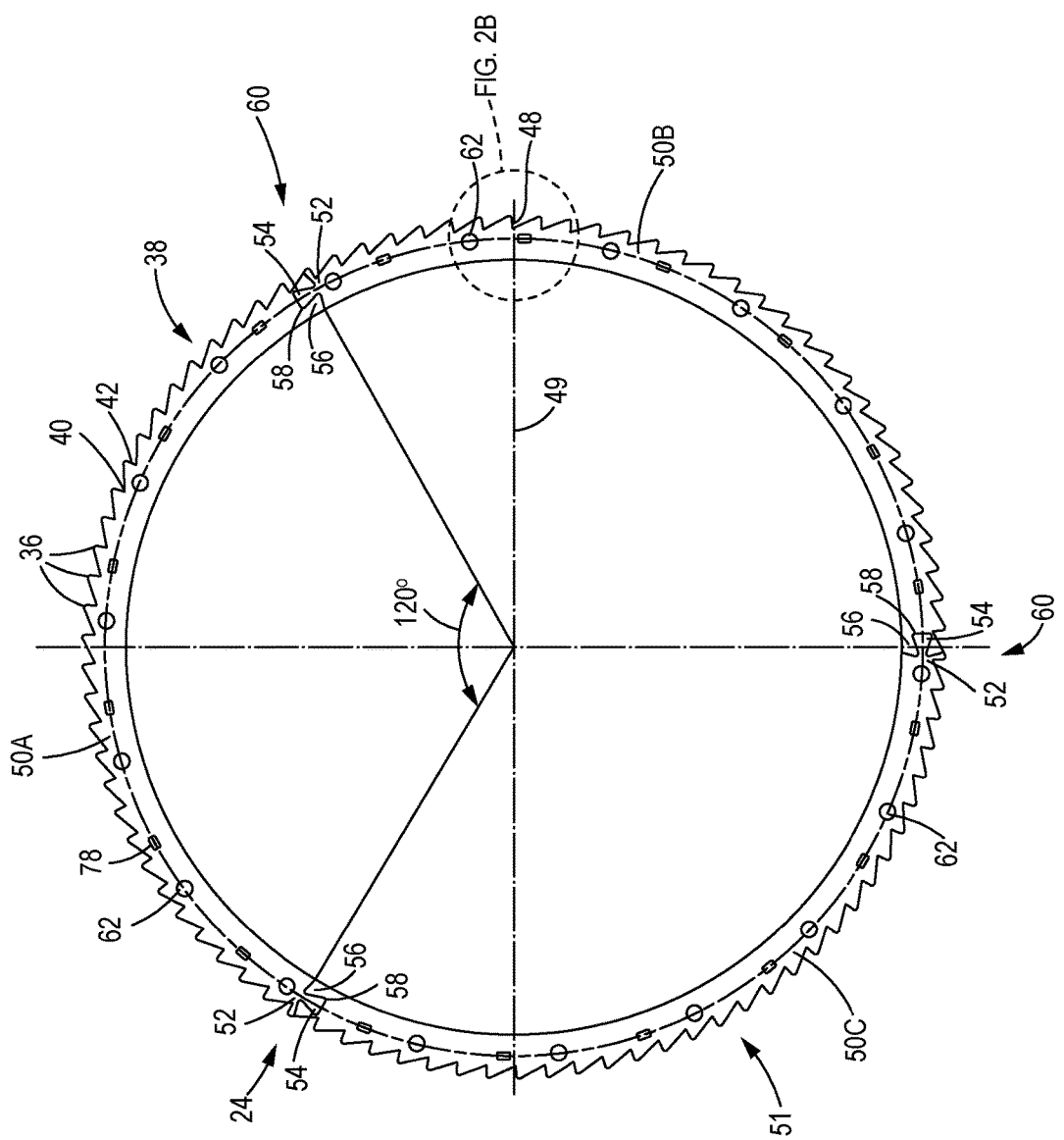
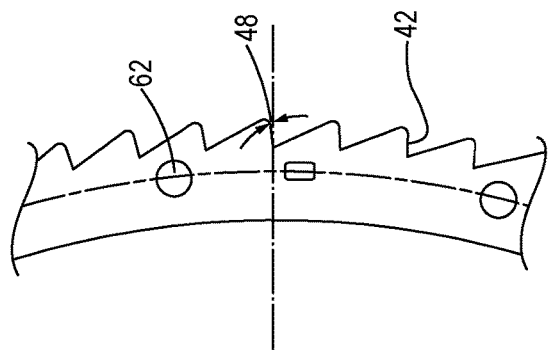
FIG. 2A
FIG. 2B

SEGMENTED AND LAMINATED ONE-WAY CLUTCH COMPONENTS

TECHNICAL FIELD

The present disclosure generally relates to clutches, and more specifically to segmented and laminated rotatable components for multi-mode clutch modules.

BACKGROUND

Multi-mode clutch modules are often incorporated with transmissions used in trucks, automobiles, tractors, and other motorized vehicles and equipment. The multi-mode clutch modules typically are utilized to connect two or more components that rotate relative to one another. As such, the multi-mode clutch modules may include components such as rotatable outer races and rotatable inner races, which are configured to rotate during operation. In some cases, the rotatable inner races may include rotational surfaces, clutch engagement surfaces, lubrication channels, torque transfer splines and engagement springs.

Currently, multi-mode clutches are manufactured using a variety of construction methods to make the inner and outer races. Such varied construction methods may use a variety of materials to form the inner and outer races such as but not limited to, wrought-machined steel, powdered metal (forged and conventional) and the like. Using these types of materials for construction of the inner and outer races is costly and may require one or more secondary processing steps to form or otherwise drill oil holes and other such features. The secondary processing may further include machining or grinding the inner and outer races down to a specified thickness where the primary processing and fabrication processes leave the inner and outer races with extra material that is later removed to achieve the specified thickness within a manufacturing tolerance.

SUMMARY

In accordance with one aspect of the present disclosure, a rotatable inner race for a multi-mode clutch module is disclosed. The race may include a plurality of arcuate segments each having a segment first end including a first end geometry and a segment second end including a second end geometry. The first end geometry and the second end geometry may be complementary to each other such that the first end geometry of one arcuate segment of the plurality of arcuate segments forms an interlocking joint with the second end geometry of an adjacent arcuate segment of the plurality of segments. Furthermore, the race may include a plurality of race engagement notches extending radially from an outer circumferential surface of each segment of the plurality of arcuate segments, wherein the plurality of arcuate segments may be joined together at the interlocking joint between adjacent arcuate segments of the plurality of arcuate segments to form a race ring, and wherein the plurality of race engagement notches of the one arcuate segment of the plurality of arcuate segments aligns with the plurality of race engagement notches of the adjacent arcuate segment of the plurality of segments to define and array of race engagement notches around an outer circumference of the race ring.

In accordance with another aspect of the disclosure, a multi-mode clutch module is disclosed. The multi-mode clutch module may include a circular outer race and a plurality of pawls pivotably coupled to the outer race, each pawl of the plurality of pawls including a toe portion and a heel portion. The multi-mode clutch portion may further include a rotatable shaft and a circular inner race rotatably coupled to the rotatable drive shaft, the circular inner race concentrically nested within the circular outer race and the rotatable drive shaft driving a rotation of the circular inner race relative to the circular outer race. The circular inner race may further include a plurality of arcuate segments each having a segment first end including a first end geometry and a segment second end including a second end geometry. The first end geometry and the second end geometry may be complimentary to each other such that the first end geometry of one arcuate segment of the plurality of arcuate segments forms an interlocking joint with the second end geometry of an adjacent arcuate segment of the plurality of segments. The circular inner race may further include a plurality of race engagement notches extending radially from an outer circumferential surface of each segment of the plurality of arcuate segments. Furthermore, each race engagement notch of the plurality of race engagement notches may have an engagement face for engaging the toe of at least one of the plurality of pawls. The plurality of arcuate segments may be joined together at the interlocking joint between adjacent arcuate segments of the plurality of arcuate segments to form a race ring, and wherein the plurality of race engagement notches of the one arcuate segment of the plurality of arcuate segments aligns with the array of race engagement notches of the adjacent arcuate segment of the plurality of segments to define an array of race engagement notches around an outer circumference of the race ring.

In yet another embodiment, a rotatable inner race for a multi-mode clutch module is disclosed. The inner race may include three identical arcuate segments each defining an arc of approximately 120 degrees and each identical arcuate segment having a segment first end including a first end geometry and a segment second end including a second end geometry. The first end geometry and the second end geometry may be complimentary to each other such that the first end geometry of one arcuate segment of the plurality of arcuate segments forms an interlocking joint with the second end geometry of an adjacent arcuate segment of the plurality of segments. The rotatable inner race may further include a plurality of race engagement notches extending radially from an outer circumferential surface of the three arcuate segments, wherein the three identical arcuate segments are joined together at the interlocking joint between adjacent identical arcuate segments to form a race ring, and wherein the plurality of race engagement notches of the one arcuate segment of the plurality of arcuate segments aligns with the array of race engagement notches of the adjacent arcuate segment of the plurality of segments to define an array of race engagement notches around an outer circumference of the race ring. The rotatable inner race may further include a plurality of race rings being assembled to form the circular inner race having a desired thickness, wherein one race ring of the plurality of race rings is aligned and adjacently positioned with an underlying race ring of the plurality of race rings forming a race ring stack, and wherein the race ring stack is joined together to form the circular inner race with the desired thickness.

These and other aspects and features of the present disclosure will be more readily understood when read in conjunction with the accompanying drawings.

BRIEF DESCRIPTION OF THE DRAWINGS

FIG. 2A depicts a top view of a race ring of a rotatable inner race of the multi-mode clutch module of FIG. 1, in accordance with an embodiment.

FIG. 2B depicts an enlarged portion of the race ring of FIG. 2A, in accordance with an embodiment.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment, since describing every possible embodiment would be impractical, if not impossible. Numerous alternative embodiments could be implemented, using either current technology or technology developed after the filing date of this patent, which would still fall within the scope of the claims defining the scope of protection.

Figure 1:
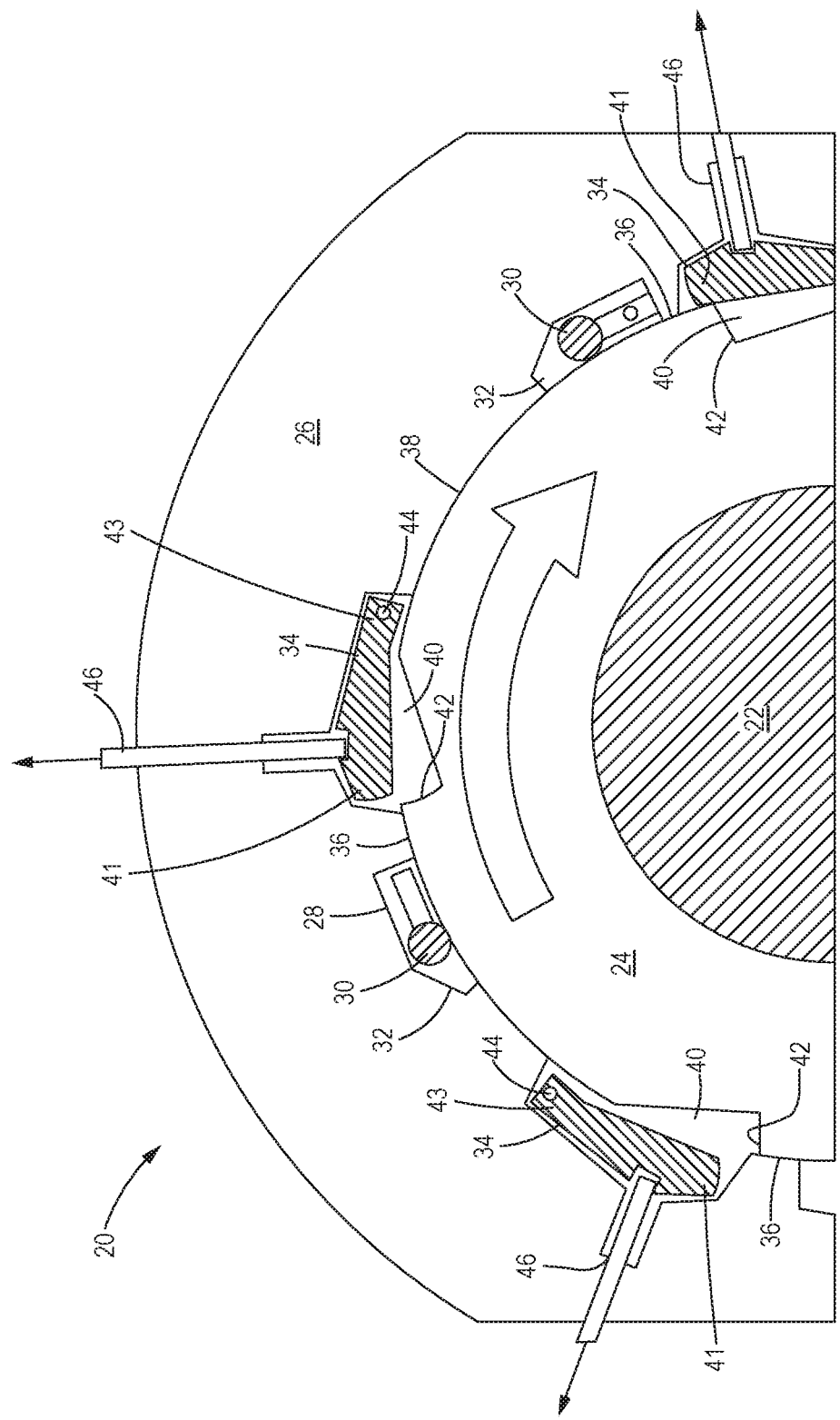
FIG. 1 depicts partial cross-sectional view of a multi-mode clutch module, in accordance with an embodiment.

Turning now to FIG. 1, a partial front cross-sectional view of an exemplary multi-mode clutch module 20 is shown. The multi-mode clutch module 20 incorporates an interior driven shaft 22 and a rotatable, circular inner race 24 coupled to the interior driven shaft 22. Accordingly, the inner race 24 rotates along with the rotation of the interior driven shaft 22, as illustrated by the arrow shown in FIG. 1. The multi-mode clutch module 20 may further include an outer race 26 radially exterior to and concentrically and/or circumferentially surrounding the inner race 24. In an embodiment, the outer race 26 may include a one-way bearing 28 such as but not limited to, a one-way roller bearing. As such, the one-way bearing 28 may include a roller 30 and a ramp 32, and the one-way bearing 28 may be configured to permit one-way rotation of the outer race 26 about the radially interior inner race 24. It will be understood that while roller bearings are shown in FIG. 1, other types of one-way bearings may alternatively or additionally be used.

Furthermore, rotation of the outer race 26 about the inner race 24 in the direction permitted by the one-way bearing 28 may be selectably controlled by one or more pawls 34 of the multi-mode clutch module 20. In an embodiment, the inner race 24 includes a plurality of race engagement notches 36 that extend radially from an outer circumferential surface 38 of the inner race 24. The plurality of race engagement notches 36 may further define a receiving slot 40 that corresponds with a toe portion 41 of the one or more pawls 34 of the multi-mode clutch module 20. Additionally, each receiving slot 40 may include an engagement face 42 which interacts with the toe portion 41 of one or more pawls 34 to selectably control rotation of the inner race 24 and/or the outer race 26 during operation of the selectable multi-mode clutch module 20.

In some embodiments, a heel portion 43 of one or more pawls 34 may be pivotally coupled or otherwise hinged to the outer race 26, or other component of the multi-mode clutch module 20, using a pin 44. While FIG. 1 shows the plurality of pawls 34 pivotably coupled to the outer race 26 at the heel portion 43 of the pawl 34, it will be understood that the plurality of pawls 34 may alternatively be pivotably coupled to the outer race 26 at a center portion or other such portion of the pawl 34. During operation of the multi-mode clutch module 20, the one or more pawls 34 may be actuated inwardly or outwardly with respect to the receiving slot 40 by an actuator rod 46. The actuator rod 46 may be movably coupled to an actuator mechanism (not shown) such as but not limited to, a solenoid, a hydraulic actuator, a pneumatic actuator or other such actuator mechanism. As shown by the outward pointing arrows in FIG. 1, the actuator rods 46 are shown to be actuated in an outward direction such that the one or more pawls 34 are biased or otherwise urged outward of the receiving slot 40 and free from the engagement face 42. Thus, the inner race 24 is free to rotate in the direction illustrated by the arrow or other such direction permitted by the one way bearing 28. Conversely, the actuator rods 46 may be actuated in an inward direction by the actuator mechanism (not shown) such that the one or more pawls 34 are urged down into the receiving slot 40 and engaged with the engagement face 42. As a result, the inner race 24 may be restricted from rotation.

Referring now to FIG. 2 with continued reference to FIG. 1, a top view of an exemplary embodiment of the circular inner race 24 incorporated into the multi-mode clutch module 20 is shown. As discussed above, the inner race 24 is a selectably rotatable component of the multi-mode clutch module 20 and thus generally may have a circular or ring-like shape. Moreover, the inner race 24 includes a plurality of race engagement notches 36 arrayed or otherwise arranged around the outer circumferential surface 38 of the inner race 24. In the illustrated embodiment, the plurality of race engagement notches 36 are arranged in a saw tooth pattern where each notch of the plurality of race engagement notches 36 define a receiving slot 40 and engagement face 42 which are configured to interact with the toe portion 41 of the one or more pawls 34 of the multi-mode clutch module. Furthermore, the plurality of race engagement notches 36 may include a rake angle 48 defined between an axis 49 of the inner race 24 and the engagement face 42 of each notch of the plurality of race engagement notches 36. In some embodiments, the rake angle 48 may be sized such that when the one or more pawls 34 are selectively actuated to interact with the engagement notches 36, the one or more pawls 34 may interact with the receiving slot 40 to restrict rotation of the inner race 24 in one direction while permitting rotation in the opposite direction. Furthermore, in one non-limiting example, the rake angle 48 may a small angle between 5° and 20°; however other values for the rake angle 48 are possible.

As further illustrated in FIG. 2, the inner race 24 may not be formed from a single piece of material. Rather, the inner race 24 may include a plurality of arcuate segments 50 that are joined together to form a race ring 51 of the circular inner race 24. In the illustrated embodiment, the race ring 51 of the inner race 24 is defined or otherwise formed by three arcuate segments 50A, 50B and 50C. Accordingly, each arcuate segment 50A, 50B and 50C defines an arc segment that is substantially 120°. Furthermore, in an embodiment, each of the arcuate segments 50A, 50B and 50C are substantially identical to each other, within manufacturing tolerance limits. Thus, arcuate segment 50A is interchangeable with arcuate segments 50B and 50C and vice versa. Furthermore, while the illustrated embodiment of the inner race 24 shows three segments, it will be understood that an alternative number (e.g., fewer or greater number) of segments may be joined together to form the race ring 51 of the inner race 24.

Figure 3:
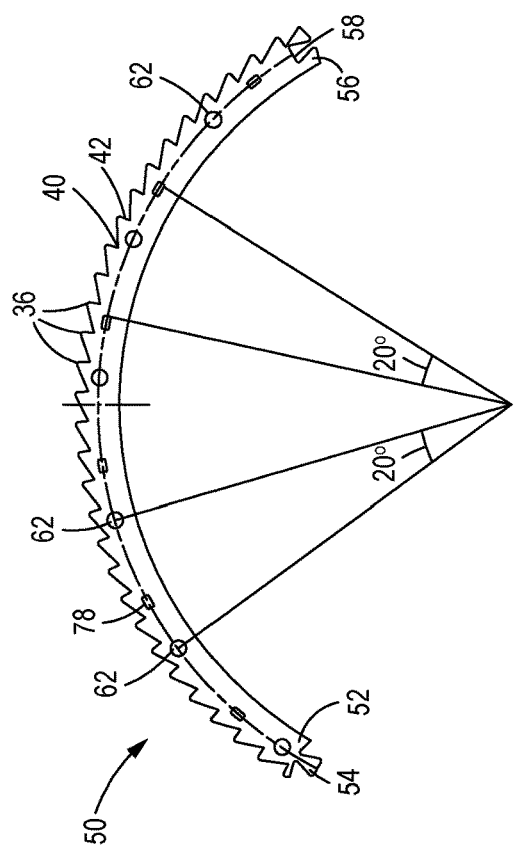
FIG. 3 depicts a top view of an arcuate segment of the race ring of FIG. 2, in accordance with an embodiment.

FIG. 3 shows a single arcuate segment 50 of the arcuate segments 50A, 50B and 50C from the inner race 24 of FIG. 2. As discussed above, the arcuate segments 50A, 50B, and 50C are substantially identical to each other and the single arcuate segment 50 shown in FIG. 3 is intended to be representative of the features included in each of the arcuate segments 50A, 50B and 50C. An embodiment of the arcuate segment 50 includes a segment first end 52 having a first end geometry 54 and a segment second end 56 having a second end geometry 58. The first end geometry 54 and second end geometry 58 are complimentary with respect to each other such that adjacent arcuate segments 50 may be joined together at an interlocking joint 60 to form the race ring 51 of the inner race 24.

Referring back to FIG. 2, one non-limiting example of the circular inner race 24 is shown being formed by interlocking or joining the first end geometry 54 of the segment first end 52 of arcuate segment 50A with the second end geometry 58 of the segment second end 56 of arcuate segment 50C, interlocking or joining the first end geometry 54 of the segment first end 52 of arcuate segment 50C with the second end geometry 58 of the segment second end 56 of arcuate segment 50B and interlocking or joining the first end geometry 54 of the segment first end 52 of arcuate segment 50B with the second end geometry 58 of the segment second end 56 of arcuate segment 50A. However, it will be understood that alternate arrangements of the plurality of arcuate segments 50 is possible.

Each arcuate segment 50 may further include a plurality of fastener holes 62 extending through the arcuate segment 50. In one embodiment shown in FIG. 4, the inner race 24 may include a plurality of layers 64 (e.g., three layers) formed from interlocking a plurality of arcuate segments 50 to form three identical race rings 51 of the circular inner race 24, as described above. Furthermore, each interlocked layer 64 of arcuate segments 50 which forms a race ring 51 of the circular inner race 24 may be stacked on top of one another to form the circular inner race 24 with a desired thickness 66. Additionally, the plurality of fastener holes 62 in adjacent layers 64 (i.e., above and/or below) may be aligned such that a fastener 68, such as but not limited to, a rivet, screw, bolt or other such fastener, may be inserted into the aligned fastener holes 62 to join or otherwise fixedly attach the plurality of layers 64 aligned and stacked on top of one another.

Figure 4:
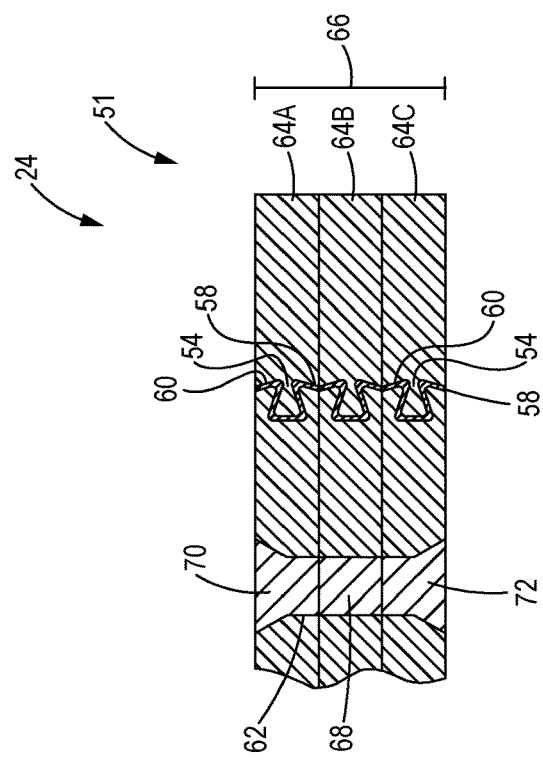
FIG. 4 depicts a partial cross-sectional view of a laminated build-up of the race ring of FIG. 2, in accordance with an embodiment.

Referring back to FIG. 3, each arcuate segment 50 may include a plurality of fastener holes 62 which are equally spaced or otherwise arranged around the arcuate segment 50. As shown, one non-limiting example of the arcuate segment 50 includes six fastener holes 62 that are arranged around the arcuate segment 50 in increments of approximately 20°. However, it will be understood that alternative numbers and arrangements of the fastener holes 62 are possible. Furthermore, as shown in FIG. 4, the fastener 68 extends through the entire desired thickness 66 of the inner race 24 and a top 70 and bottom 72 portion of the fastener 68 are flush or recessed with the surface of the inner race 24 such that the fastener 68 does not protrude from the top 74 and/or bottom 76 surface of the inner race 24. In one non-limiting example, the desired thickness 66 of the inner race 24 is approximately 4.5 mm. As such, three layers 64 of race rings 51 formed by interlocked arcuate segments 50A, 50B and 50C (FIG. 2), each measuring approximately 1.5 mm thick, may be aligned and stacked on top of one another to build up and form the circular inner race 24 with the desired thickness 66 (e.g., 4.5 mm thick). Alternatively, five layers 64 race rings 51 formed by interlocked arcuate segments 50A, 50B and 50C (FIG. 2), each measuring approximately 0.9 mm thick, may be aligned and stacked on top of one another to build up and form the circular inner race with the desired thickness 66 (e.g., 4.5 mm thick). It will be understood that alternative thicknesses may be used for the individual layers 64 and an alternative number (i.e., fewer or greater) of layers 64 may be stacked on top of one another to build up the desired thickness 66 of the circular inner race 24.

As further illustrated in FIG. 4, the plurality of layers 64 which are stacked on top of one another to build up the desired thickness 66 of the inner race 24, may be rotated or offset from one another. As a result, the interlocking joints 60 formed by linking the arcuate segments 50 (FIG. 2) together to form one layer 64 of the circular inner race 24 can be offset from the interlocking joints 60 formed by linking the arcuate segments 50 (FIG. 2) together to form adjacent layers 64 (e.g., above and/or below). In one non-limiting example, the plurality of layers 64 are rotated with respect to each other such that the interlocking joints 60 of one layer 64 are offset or in non-alignment with the interlocking joints 60 of the other layers 64. Furthermore, each layer 64 is rotated such that while the interlocking joints 60 are in non-alignment with each other, the fastener holes 62 of each layer 64 are in alignment with each other.

As discussed above, one non-limiting example of the circular inner race 24 includes three layers 64A, 64B and 64C of race rings 51 as shown in FIG. 4. The arcuate segments 50A, 50B and 50C (FIG. 2) are interlocked together to form a first race ring 51 which defines the bottom layer 64C. A second set of identical arcuate segments 50A, 50B and 50C are interlocked to form a second race ring 51 which defines the second or intermediate layer 64B of the inner race 24. The second or intermediate layer 64 is stacked or otherwise adjacently positioned on top of the bottom layer 64C. The second layer 64B may be rotated approximately 30°, or other rotation amount being a multiple of 30°, with respect to the bottom layer 64C. Accordingly, the fastener holes 62 in the bottom layer 64C and intermediate layer 64B align with each other while the interlocking joints 60 of the bottom layer 64C are offset approximately 30°, or multiple of 30°, with respect to the interlocking joints 60 of the intermediate layer 64B. Additionally, a third set of identical arcuate segments 50A, 50B and 50C are interlocked to form a third race ring 51 which defines the top layer 64A that is stacked or otherwise adjacently positioned on top of the intermediate layer 64B. The top layer 64A may be rotated approximately 30°, or other rotation amount being a multiple of 30°, with respect to the second layer 64B and bottom layer 64C. Thus the fastener holes 62 in the bottom layer 64C, intermediate layer 64B and top layer 64A align with each other while the interlocking joints 60 of the layers 64A, 64B and 64C are offset approximately 30°, or multiple of 30°, with respect to one another. In other words, each layer 64A, 64B and 64C of the circular inner race 24 is rotated such that the interlocking joints 60 of each layer 64A, 64B and 64C are in non-alignment with one another.

Figure 5:
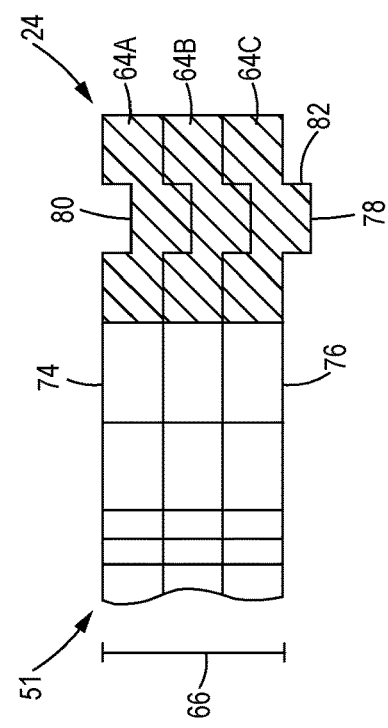
FIG. 5 depicts a partial cross-sectional view of a laminated build-up of the race ring of FIG. 2, in accordance with an embodiment.

Referring now to FIG. 5, with reference to FIGS. 2 and 3, at least one alignment tab 78 is shown in each arcuate segment 50A, 50B and 50C of the inner race 24. As illustrated in FIG. 5, the alignment tab 78 defines a feature that is stamped, molded or otherwise formed into a portion of the thickness of each layer 64A, 64B and 64C of the inner race 24. Each alignment tab 78 may include an indentation portion 80 defined on the top surface 74 of each layer 64A, 64B and 64C and a corresponding protruding portion 82 extending from the bottom surface 76 of each layer 64A, 64B and 64C. As mentioned above, the layers 64A, 64B and 64C are formed from arcuate segments 50A, 50B, and 50C are substantially identical to one another. Accordingly, the alignment tab 78 from one layer 64 of the plurality of layers 64A, 64B and 64C are complimentary to the alignment tab 78 from an adjacent layer 64 (i.e., above and/or below) of the plurality of layers 64.

As shown in FIG. 5, the alignment tab 78 in layer 64A is aligned with the alignment tab 78 in layer 64B. The protrusion portion 82 extending from the bottom surface 76 of layer 64A engages with and fits tightly into the indentation portion 80 defined in the top surface 74 of layer 64B. Furthermore, the alignment tab 78 in layer 64B is aligned with the alignment tab 78 in layer 64C. Accordingly, the protrusion portion 82 extending from the bottom surface 76 of layer 64B engages with and fits tightly into the indentation portion 80 defined in the top surface 74 of layer 64C. In some embodiments, the protrusion portion 82 extending from the bottom surface 76 of layer 64C may be machined or filed to provide a flat surface along the bottom surface 76 of layer 64C and the circular inner race 24. The alignment tab 78 in each layer 64A, 64B and 64C may help align, position, and stabilize each layer 64A, 64B and 64C during build-up of the desired thickness 66 of the circular inner race 24. Referring back to FIG. 3, with continued reference to FIG. 5, a plurality of alignment tabs 78 are arrayed or equally spaced around the arcuate segment 50. Similar to the plurality of fastener holes 62, one non-limiting example of the arcuate segment 50 includes six alignment tabs 78 that are arranged around the arcuate segment 50 in increments of approximately 20°. However, it will be understood that alternative numbers and arrangements of the fastener holes 62 are possible. As discussed above, the circular inner race 24 may include a plurality of layers 64, and in one non-limiting example the inner race includes three layers 64A, 64B and 64C. Each layer 64 is formed from a plurality of arcuate segments 50 such as the arcuate segments 50A, 50B and 50C shown in FIG. 2. Accordingly, during build-up of the desired thickness 66 of the circular inner race 24, the three layers 64A, 64B and 64C may be stacked on top of each other. In some embodiments, each layer 64 may be rotated or indexed with respect to adjacent layers (i.e., above and/or below) such that the interlocking joints 60 of the layers 64A, 64B and 64C are in non-alignment with each other.

For example, the circular inner race 24 (FIG. 2) includes three identical layers 64A, 64B and 64C as shown in FIGS. 4 and 5. Identical arcuate segments 50A, 50B and 50C (FIG. 2) are interlocked together to form the bottom layer 64C. A second set of identical arcuate segments 50A, 50B and 50C are interlocked to form the second or intermediate layer 64B that is stacked or otherwise positioned on top of the bottom layer 64C. The second layer 64B may be rotated approximately 30°, or other rotation amount being a multiple of 30°, with respect to the bottom layer 64C. Accordingly, the indentation portion 80 of each alignment tab 78 in the bottom layer 64C and the protruding portion 82 of each alignment tab 78 in the second or intermediate layer 64B align with each other. The 30° rotation between the bottom layer 64C and second or intermediate layer 64B causes an offset or non-alignment between the interlocking joints 60 of the bottom layer 64C with respect to the interlocking joints 60 of the second or intermediate layer 64B. Additionally, a third set of identical arcuate segments 50A, 50B and 50C are interlocked to form the top layer 64A that is stacked or otherwise positioned on top of the intermediate layer 64B. The top layer 64A may be rotated approximately 30°, or other rotation amount being a multiple of 30°, with respect to the second layer 64B. Thus the plurality of alignment tabs 78 in the bottom layer 64C, the second or intermediate layer 64B and the top layer 64A align with each other while the interlocking joints 60 of the layers 64A, 64B and 64C are offset approximately 30°, or multiple of 30°, with respect to one another. In other words, each layer 64A, 64B and 64C of the circular inner race 24 is rotated such that the plurality of alignment tabs 78 of each layer 64A, 64B and 64C are in alignment with each other and the interlocking joints 60 of each layer 64A, 64B and 64C are in non-alignment with one another.

INDUSTRIAL APPLICABILITY

Figure 6:
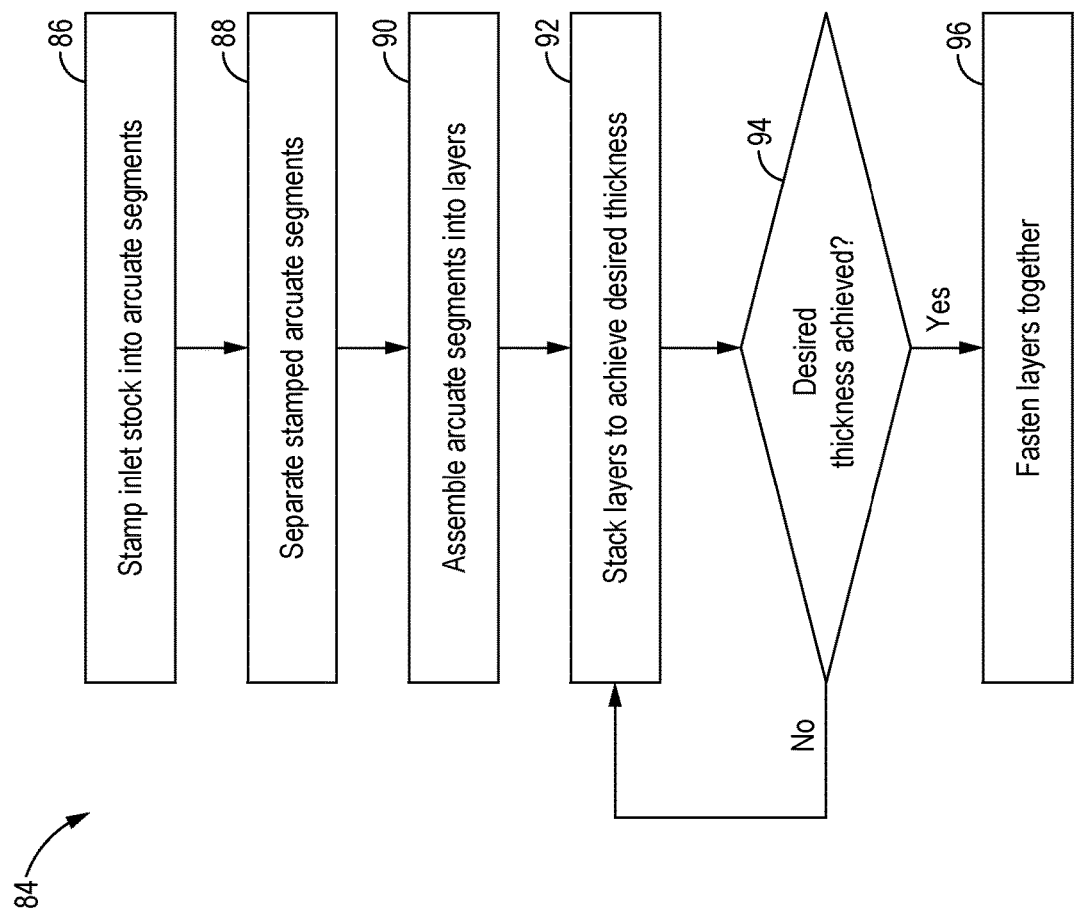
FIG. 6 depicts a method for manufacturing a laminate disc, in accordance with an embodiment.

In general, the teachings of the present disclosure may find broad applicability in many industries including, but not limited to, automotive, single-track vehicle, marine, electronic, and transportation industries. In particular, the present disclosure may find applicability in any industry using machines or equipment including circular discs. Disclosed herein is a method for manufacturing circular discs, in accordance with an embodiment of the disclosure. In addition to the method 84 of manufacturing the circular inner race 24 of the multi-mode clutch module as outlined in the flow chart of FIG. 6, different aspects of the components of the circular inner race 24 discussed in relation to the FIGS. 1-5 will also be referred to herein, as appropriate.

As mentioned above, FIG. 6 depicts a method 84 of manufacturing the circular inner race 24, in accordance with an embodiment. In particular, at a first block 86, an embodiment of the method 84 includes stamping inlet stock of material to form a plurality of the arcuate segments 50. The inlet stock material is an appropriate metal such as steel, stainless steel, steel alloy or other suitable material. Furthermore, the inlet stock may be stamped by a die or other such stamping tool that includes the features to be defined in the arcuate segments 50 such as but not limited to, the plurality of race engagement notches 36, first end geometry 54, second end geometry 58, plurality of fastener holes 62, plurality of alignment tabs 78 and the like. Accordingly, since the circular inner race 24 is formed of the plurality of arcuate segments 50 which are identical to each other, the die or stamping tool may be designed to stamp a repeating pattern of arcuate segments 50 into the inlet stock material. Furthermore, the die or stamping tool may be designed or otherwise configured to efficiently stamp or pattern the inlet stock to reduce the amount of waste or scrap material left over after stamping the arcuate segments 50 into the inlet stock material.

Once the inlet stock material has been stamped, in a next block 88 the plurality of arcuate segments 50 may be separated from the inlet stock material. In one embodiment, the stamped inlet stock material including the plurality of arcuate segments 50 may be fed into a separating mechanism that automatically separates the arcuate segments 50 from the scrap portion of the inlet stock material. Furthermore, once the arcuate segments 50 are separated, they may go through a cleaning and/or inspection process that removes unwanted effects from the stamping procedure such as but not limited to, particles, rough edges, oil, or other such contamination. Additionally, the arcuate segments 50 may be inspected to ensure features such as the race engagement notches 36, first end geometry 54, second end geometry 58, fastener holes 62, alignment tabs 78 and other such structures were formed correctly during stamping.

In a next block 90, the plurality of arcuate segments 50 may be assembled together to form layers 64 of race rings 51 of the circular inner race 24. As discussed above, the plurality of layers 64 may be formed from joining three arcuate segments 50A, 50B and 50C together into a continuous race ring 51. Therefore, in an embodiment, the arcuate segments 50A, 50B and 50C are defined as identical arcuate structures having an arc angle of approximately 120°. The segment first end 52 of arcuate segment 50A is joined to the segment second end 56 of arcuate segment 50C, the segment first end 52 of arcuate segment 50C is joined to the segment second end 56 of arcuate segment 50B, and the segment first end 52 of arcuate segment 50B is joined to the segment second end 56 of arcuate segment 50A. However, it will be understood that the plurality of layers 64 may be formed by joining fewer or greater numbers of arcuate segments 50 together. As a result, the arcuate segments 50 may define identical arcuate structures having alternative arc angles such as but not limited to, 180°, 90°, 72°, and the like, that correspond to the number of arcuate segments 50 joined together to form each layer 64.

After the plurality of layers 64 are joined together, in a next block 92, each of the layers 64 of race rings 51 may be treated or otherwise coated with an adhesive material that serves to fixedly attach and laminate the plurality of layers 64 together during build-up of the desired thickness 66 of the inner race 24. In an embodiment, the adhesive material may be sprayed onto the top and/or bottom surface 74, 76 of each layer 64. Alternatively, a plurality of droplets may be dispensed onto the top and/or bottom surface 74, 76 of each layer. Furthermore, in one non-limiting example, the adhesive may be sprayed, dispensed or otherwise applied onto each layer according to the position in the built-up or laminated stack of layers 64. For example, adhesive may be applied to the top surface 74 of layer 64C (i.e., bottom layer of circular inner race 24) and the bottom surface 76 of layer 64A (i.e., top layer of circular inner race 24). Moreover, adhesive may be applied to both the top and bottom surface 74, 76 of layer 64B (i.e., second or intermediate layer of circular inner race 24). Alternatively, layer 64B may not have any adhesive applied to either top or bottom surface 74, 76. Rather, the adhesive applied or dispensed on layers 64A and 64C is sufficient to bond the layers 64A, 64B and 64C together during the build-up and lamination of the circular inner race 24.

Additionally, during the assembly of layers 64, block 92 may further include an indexing step following the placement of each layer 64 during the build-up and lamination of the circular inner race 24. Furthermore, the number of layers 64 built-up and laminated together to form the circular inner race 24 will depend on the desired thickness 66 of the circular inner 24 and the thickness of each layer 64. In one non-limiting example the desired thickness 66 of the circular inner race 24 is approximately 4.5 mm thick. Accordingly, as shown in FIGS. 4 and 5, three layers 64A, 64B, and 64C, each layer 64 being approximately 1.5 mm thick, will be built-up to form the circular inner race 24. Additionally, each layer 64 may be rotationally offset from one another such that the interlocking joints 60 from layers 64A, 64B and 64C are in non-alignment with one another.

For example, a first race ring 51 may be designated as the bottom layer 64C of the circular inner race 24 and therefore be the first layer 64 positioned in the build-up of the circular inner race 24. Next, a second race ring 51 may be designated as the intermediate or second layer 64B and placed on top of underlying layer 64C. During placement, layer 64B may be rotationally indexed approximately 30°, (or a multiple of 30°) relative to layer 64C such that the interlocking joints 60 of layer 64C are rotationally offset from the interlocking joints 60 of layer 64B. Once layer 64B is in position, layer 64A, designated as the top layer, may be placed on top of underlying layer 64B. During placement, layer 64A may be rotationally indexed approximately 30° (or multiple of 30°) relative to layer 64B such that the interlocking joints 60 of layers 64C, 64B and 64A are rotationally offset from one another. Furthermore, the rotational index amount between each layer 64A, 64B and 64C (i.e., 30°) corresponds to the spacing between the fastener holes 62 and alignment tabs 78 defined in each layer 64 of the circular inner race 24. As a result, the fastener holes 62 and alignment tabs 78 in layers 64A, 64B and 64C will still be in alignment with one another.

Once the desired thickness 66 of the circular inner race 24 is obtained, in a next block 94, the built-up layers 64A, 64B and 64C may be laminated and fastened together to form the circular inner race 24. Furthermore, the layers 64A, 64B and 64C may be inserted into a lamination press that exerts pressure on all of the layers 64 to help facilitate bond formation between the previously applied adhesive and each of the layers 64A, 64B and 64C. In some embodiments, the lamination press may include a heating element that is capable of heating the press to a desired elevated temperature. The elevated temperature may further facilitate the bond formation between the layers 64 by flowing the adhesive so it evenly coats the bonding surface between adjacent layers 64. Following lamination, a plurality of fasteners 68 may be inserted into each of the plurality of fastener holes 62 extending through the layers 64A, 64B and 64C. In an embodiment, the plurality of fasteners 68 are rivets, screws, bolts, or other such fastening devices, and serve to help keep the layers 64A, 64B and 64C fastened together during use of the circular inner race.

It will be understood that the method 84 of manufacturing the circular inner race 24 discussed above provided one non-limiting example, and alternative methods may be contemplated for assembling the circular inner race 24. Furthermore, the circular inner race 24 of the present disclosure may have particular utility in one way, multi-mode clutch modules 20 for coupling an engine output shaft to a transmission. Accordingly, operational conditions (e.g., force, stress, temperature) may be more severe that other applications, such as clutches installed in transmissions and/or differentials. As such, the arcuate segments 50 and layers 64 which are joined and built up to form the circular inner race 24 are designed to withstand these operational conditions. More specifically, the interlocking joints 60, fastener holes 62, fasteners 68, alignment tabs 78 provide the necessary structural and material integrities needed to reliably perform in high stress and high temperature environments.

Furthermore, it will be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for the sake of clarity only so as to not confuse the reader, and it is not intended that such claim term be limited, by implication or otherwise, to that single meaning.

What is claimed is:

1. A laminated rotatable inner race for a multi-mode clutch module, the rotatable race formed by a plurality of race rings; each race ring comprising:
   a plurality of arcuate segments each having a segment first end including a first end geometry and a segment second end including a second end geometry, the first end geometry and the second end geometry being complementary to each other such that the first end geometry of one arcuate segment of the plurality of arcuate segments forms an interlocking joint with the second end geometry of an adjacent arcuate segment of the plurality of segments; and
   a plurality of race engagement notches extending radially from an outer circumferential surface of each segment of the plurality of arcuate segments,
   wherein the plurality of arcuate segments are joined together at the interlocking joint between adjacent arcuate segments of the plurality of arcuate segments to form a continuous race ring, and wherein the plurality of race engagement notches of the one arcuate segment of the plurality of arcuate segments aligns with the plurality of race engagement notches of the adjacent arcuate segment of the plurality of segments to define an array of race engagement notches around an outer circumference of the race ring;
   wherein an adhesive is applied to the plurality of race rings, the race rings being positioned together to form a race ring stack having a desired thickness, and wherein the race ring stack is heated under pressure to form the laminated rotatable inner race.

2. The laminated rotatable inner race of claim 1, wherein each race ring of the race ring stack includes a plurality of alignment tabs, each alignment tab having an indentation formed on a first surface of each race ring and a corresponding protrusion extending from a second surface opposite the first surface of each race ring, and wherein each protrusion of the plurality of alignment tabs on the one race ring of the plurality of race rings is engaged with each corresponding indentation of the plurality of alignment tabs on the underlying race ring of the plurality of race rings such that the alignment tabs align and maintain a position of each race ring during assembly of the race ring stack.

3. The laminated rotatable inner race of claim 2, wherein each race ring of the race ring stack includes a plurality of fastener holes and the plurality of alignment tabs further align the plurality of fastener holes of each race ring, and wherein a fastener is inserted into each fastener hole of the plurality of fastener holes during assembly of the race ring stack.

4. The laminated rotatable inner race of claim 1, wherein each race ring of the plurality of race rings is indexed with respect to any adjacent race ring such that the interlocking joints of any one race ring are offset from the interlocking joints of the adjacent race ring.

5. The laminated rotatable inner race of claim 4, wherein each race ring of the plurality of race rings is indexed by approximately 30° with respect to the adjacent race ring of the plurality of race rings.

6. The laminated rotatable inner race of claim 1, wherein a receiving slot is defined between each race engagement notch of the plurality of race engagement notches of each race ring, and wherein the receiving slot is configured to interact with at least one pawl of the multi-mode clutch module to restrict a rotation of the rotatable race during operation of the multi-mode clutch module.

7. The laminated rotatable inner race of claim 1, wherein the plurality of arcuate segments of each race ring are symmetrical, and wherein the continuous race ring includes three arcuate segments, with each arcuate segment defining a race ring arc of approximately 120°.

8. A rotatable inner race for a multi-mode clutch module, the rotatable race formed by a plurality of laminated race rings; each race ring comprising:
   three identical arcuate segments each defining an arc of approximately 120° and each identical arcuate segment having a segment first end including a first end geometry and a segment second end including a second end geometry, the first end geometry and the second end geometry being complementary to each other such that the first end geometry of one arcuate segment of the plurality of arcuate segments forms an interlocking joint with the second end geometry of an adjacent arcuate segment of the plurality of segments;
   a plurality of race engagement notches extending radially from an outer circumferential surface of the three arcuate segments,
   wherein the three identical arcuate segments are joined together at the interlocking joint between adjacent identical arcuate segments to form a continuous race ring, and wherein the plurality of race engagement notches of the one arcuate segment of the plurality of arcuate segments aligns with the array of race engagement notches of the adjacent arcuate segment of the plurality of segments to define an array of race engagement notches around an outer circumference of the race ring; and
   wherein an adhesive is applied to the race rings, the race rings are positioned together to form a race ring stack having a desired thickness, and wherein the race ring stack is heated under pressure to laminate the rotatable inner race.

9. The rotatable inner race of claim 8, wherein each race ring of the race ring stack includes a plurality of alignment tabs, each alignment tab having an indentation formed on a first surface of each race ring and a corresponding protrusion extending from a second surface opposite the first surface of each race ring, and wherein each protrusion of the plurality of alignment tabs on the one race ring of the plurality of race rings is engaged with each corresponding indentation of the plurality of alignment tabs on the underlying race ring of the plurality of race rings such that the alignment tabs align and maintain a position of each race ring during assembly of the race ring stack.

10. The rotatable inner race of claim 8, wherein each race ring of the plurality of race rings is indexed by approximately 30° with respect to an adjacent race ring of the plurality of race rings such that the interlocking joints of any race ring is offset from the interlocking joints of any adjacent race ring.

11. The rotatable inner race of claim 8, wherein a receiving slot is defined between each race engagement notch of the plurality of race engagement notches of each race ring, and wherein the receiving slot is configured to interact with at least one pawl of the multi-mode clutch module to restrict a rotation of the rotatable inner race during operation of the multi-mode clutch module.

* * * * *